April 26, 1960  I. A. SPEELMAN  2,934,061
SPHYGMOMANOMETERS
Filed June 3, 1957  3 Sheets-Sheet 1
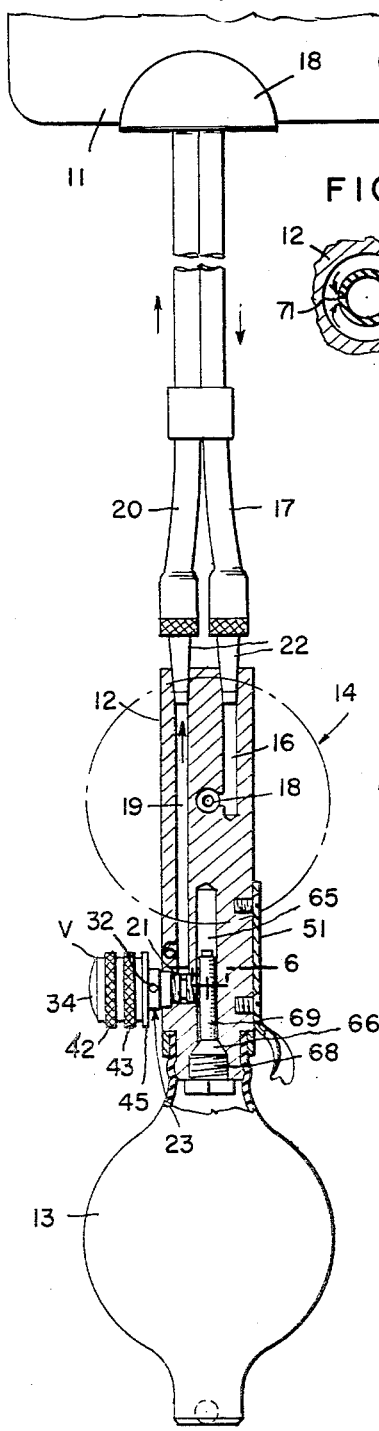
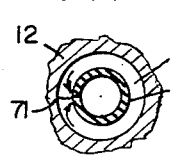
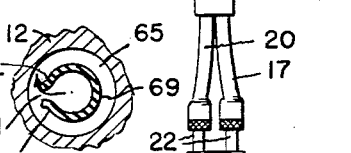
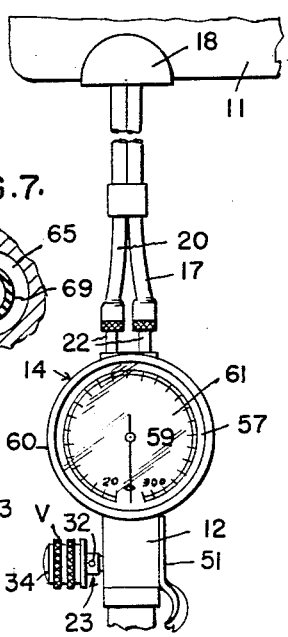
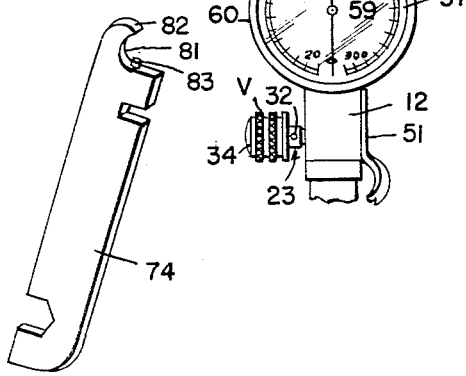
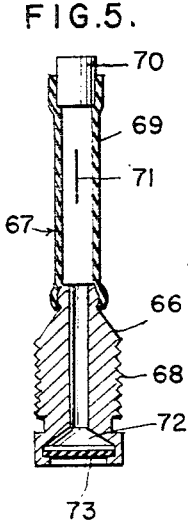
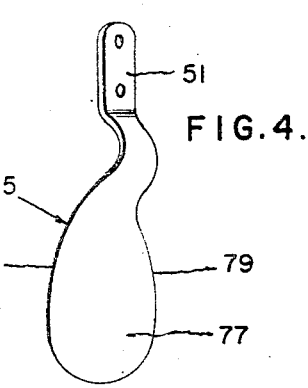
INVENTOR.
Irving A. Speelman
BY Arthur Middleton
ATTY.

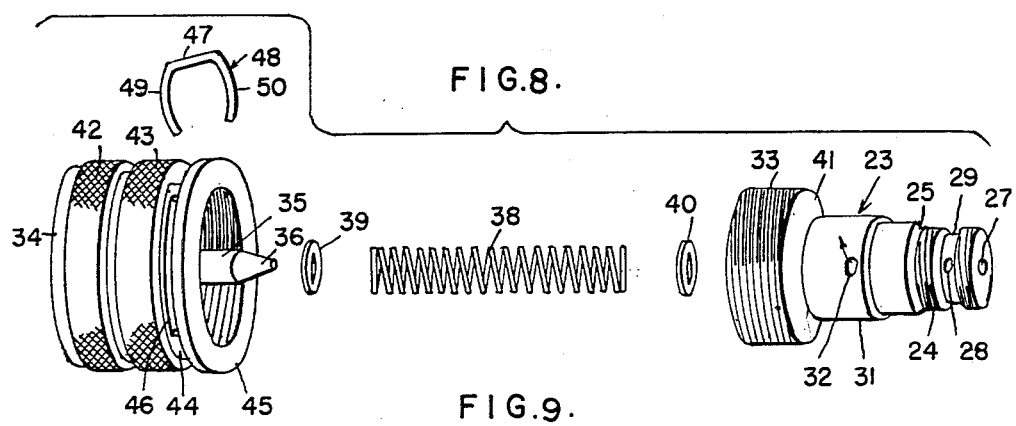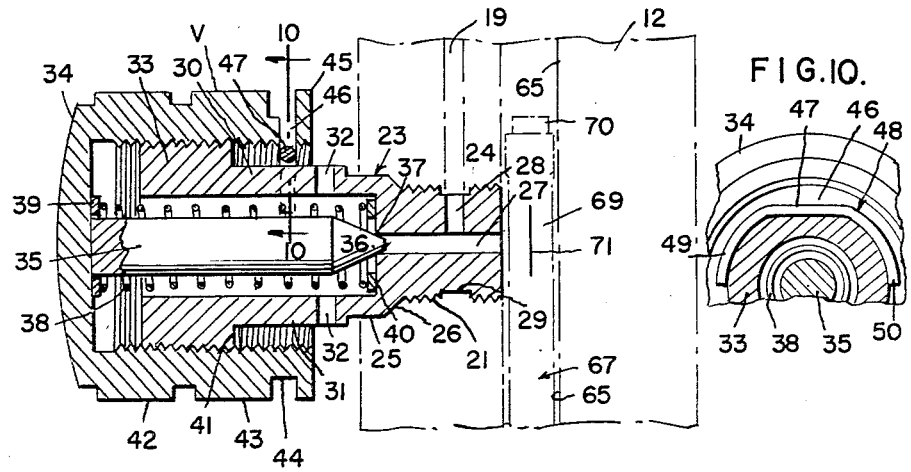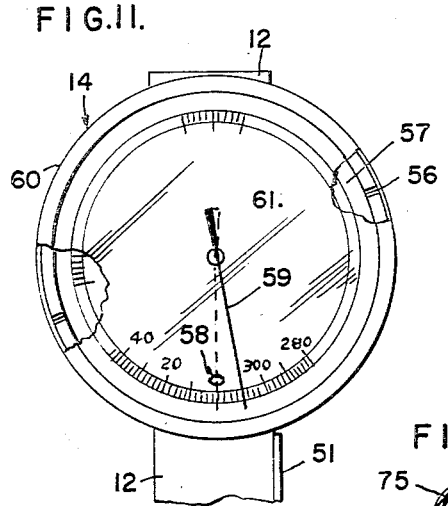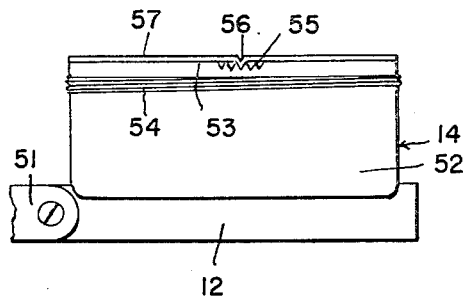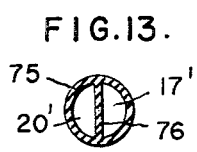

April 26, 1960 I. A. SPEELMAN 2,934,061
SPHYGMOMANOMETERS
Filed June 3, 1957 3 Sheets-Sheet 3
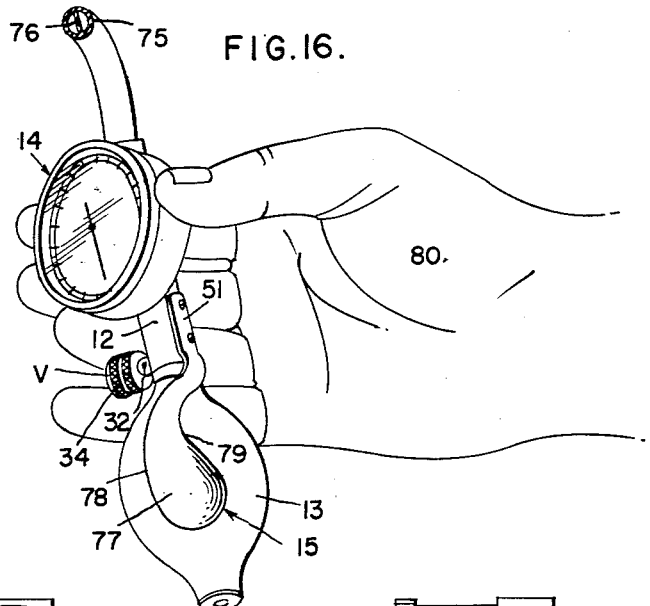
FIG. 16.
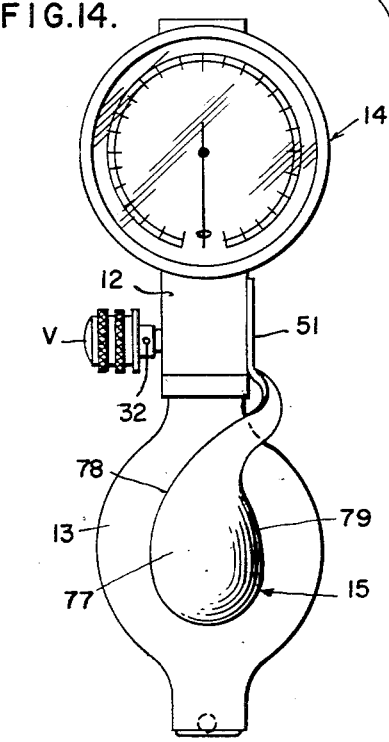
FIG. 14.
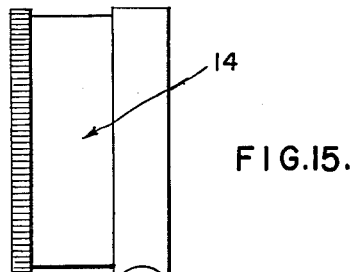
FIG. 15.
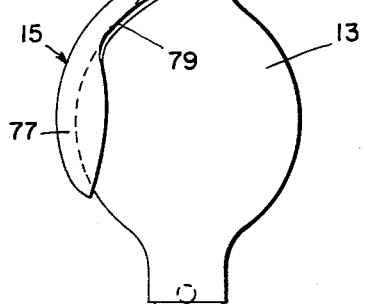
INVENTOR.
Irving A. Speelman
BY Arthur Middleton
ATTY.

United States Patent Office 2,934,061
Patented Apr. 26, 1960

2,934,061

SPHYGMOMANOMETERS

Irving A. Speelman, Brooklyn, N.Y., assignor to Propper Manufacturing Company, Inc., Long Island City, N.Y., a corporation of New York Application June 3, 1957, Serial No. 663,034

9 Claims. (Cl. 128—2.05)

This invention relates to sphygmomanometers, namely, instruments for the measuring of blood pressure. Such instruments usually are composed of an inflatable cuff that goes around a patient's arm or leg, a compressible bulb for pressure generation, tube means for connecting the bulb with the cuff, valve means for relieving pressure in the cuff, and a pressure-indicating gauge for measuring the amount of pressure in the system. It is one object of this invention to assemble these essential elements so that the bulb supplies pressured air to the cuff by one path and the return flow of pressured air from the cuff to the pressure gauge is through an independent path. Another object is to devise a new type of relief valve for such an assembly that can be easily replaced, since these valves wear out. Still a further object is to devise a special type of support for the bulb as the support is related to the hand of the operator. The pressure gauges usually are aneroid gauges, and sometimes the zero-marking on the dial of the gauge gets displaced with respect to the zero position of the pointer, so it is another object of this invention to devise means whereby the zero-marking can be adjusted without having to disturb the pointer.

With these, and other objects that will appear hereinafter, the invention can be practiced by an embodiment that may be described as having basically an inflatable cuff, an air-pumping compressible bulb, a rigid neck-like body member having two ducts therein at one end of one of which the bulb is connected, having an outlet port in that duct between the cuff and the bulb, a valve assembly for the outlet port carried by the member, an aneroid pressure-indicating gauge carried by the member communicating independently with the cuff through the other duct, and separate tube means connecting the ducts with the cuff. To this may be added means for rendering the valve assembly removable from the outlet port and from the member; locating the valve assembly close to the bulb so that while the operator's hand is around the bulb, the valve can be operated by his fingers without removing his hand from the bulb; means whereby the gauge has a zero-bearing dial and a rotatable pointer with means for rotationally adjusting the zero on the dial with respect to the pointer; and perhaps a peculiarly shaped spool-like extension on the member against which the bulb can be compressed. Also, there are details of novelty in the valve assembly itself.

The invention is illustrated in the accompanying drawing in which Figure 1 is a partial view that shows the sphygmomanometer, with parts in section, omittting the gauge, whereas Fig. 2 is a similar view showing the gauge. Fig. 3 is an isometric view of a spanner tool for use in removing the valve assembly from the sphygmomanometer. Fig. 4 is an isometric view of the spoon. Fig. 5 is a vertical sectional view through the back-up valve 67. Fig. 6 is a transverse view along the line 6—6 in Fig. 1; while Fig. 7 is a view similar to Fig. 6 except that the slit 71 of the hose 69 of the back-up valve is open. Fig. 8 is an exploded view of the valve assembly. Fig. 9 is an enlarged vertical sectional longitudinal view of the valve assembly. Fig. 10 is a partial transverse sectional view taken along the line 10—10 in Fig. 9. Fig. 11 is a plan view of the gauge, while Fig. 12 is a side elevation thereof with the bezel removed. Fig. 13 is a transverse sectional view of a modified construction of the tubes 17 and 20. Fig. 14 shows a front view somewhat similar to Fig. 2, showing the particular spoon-shaped element, while Fig. 15 shows a side view. Fig. 16 in an isometric view showing the hand of a technician and how the sphygmomanometer fits into it.

In the drawings, the sphygmomanometer is made up of the inflatable cuff 11, and a rigid body member 12 that may be ovaloid or cylindrical or rectangular in cross-sectional shape that carries an air-pressure inducing or generating compressible bulb 13, an aneroid pressure-indicating gauge 14, a pressure-relief valve assembly V, and a spoon-like element 15 having a wry-shaped handle-like extension or neck portion 51 for attachment to the body member 12. The body member 12 has two ducts therein of which a shorter one 16 communicates with a tube 17 providing a passageway leading to the cuff 11, as well as with a transverse bore 18 leading to the aneroid gauge 14, while another longer duct 19 in the body member communicates at one end with the cuff 11 through a tube 20 providing another passageway, and at the other end with a pressure outlet port 21 in the body member 12. The tubes 17 and 20 each have a tapered fitting 22 for removable attachment to their reselective ducts in the body member.

Into the pressure outlet port 21 in the body member 12, at the terminal end of the longer duct 19, is the valve assembly V, made up of a cup-shaped piece or casing indicated generally at 23, having a boss section 24 threaded into the outlet port 21 so that the coned or bevelled shoulder 25 air-tightly seats in complementary shaped seat 26 in the body member. The boss has a central bore 27 with one or more radial extensions 28 leading to a peripheral groove 29 on the boss that is aligned with the longer duct 19. In the cup section 30 of the casing 23, there is an intermediate cylindrical section 31 having radial bores 32 communicating from the interior of the cup to the atmosphere. The outer section 33 of the cup-shaped casing has larger diameter and is threaded and has screwed thereover a cap piece 34, from which projects axially and inwardly therefrom a valve stem 35 terminating in a conical valve plug 36 adapted by longitudinal movement to open and close the valve-seat 37 surrounding the terminal end of the bore 27 in the boss section 24 of the cup-shaped casing 23. Surrounding the valve stem 35 is a coiled spring 38, bearing against two washers 39 and 40, for the purpose of spring-biasing the cap piece 34. 41 represents a shoulder between the larger section 33 and the intermediate section 31 of the cup-shaped casing 23. The cap piece 34 has two spaced-apart exterior knurled sections 42 and 43 for finger-gripping, then a groove 44 and finally a flange 45. In the groove 44, there is a cut-away portion 46, which is adapted to be bridged by the flattened part 47 of a spring clip 48 having curved legs 49 and 50 that straddle the groove. This spring clip 48 is easily removable and replaceable from the groove 44, but when it is in place, it acts to control the limit to which the cap piece of the valve assembly can be unscrewed, for in the process of unscrewing, it comes up against the shoulder 41 on the cup-shaped casing 23. It also, by its locking function, precludes inadvertent loss or displacement of the valve assembly.

Coming now to the pressure-indicating gauge shown generally at 14, it is made up of a cylindrical casing 52, having a peripheral edge 53, and screw threads 54. The edge has indentations such as formed by teeth or serrations 55, adapted to have fit thereinto a complementary lateral extension or ridge 56 depending from the dial 57. The dial has a zero-mark 58, and a pointer or hand 59 rotates over the dial. A bezel ring 60 fits over the casing and is screwed thereto to hold firmly in place a crystal 61. When the crystal is firmly in place and held there by the bezel ring, the dial is forced against the casing and the ridge 56 on the dial 57 is locked in position between appropriate serrations or depressions 55 of the casing 52.

The compressible bulb 13, for pressure generation, is connected with a bore 65 extending upwardly in the body 12 and communicating with the transverse bore 27 in the boss section 24 of the valve assembly V. At its entrance end 66 from the bulb, the bore is tapered and enlarged for the purpose of housing what is called herein a back-up or check valve 67, shown in Fig. 5, of itself, and in place in Figs. 1 and 9. It is formed with a nut-headed apertured nipple 68 having connected to its upper end a length of resilient hose 69, such as of rubber, and closed at its top by a plug 70. Intermediate its length is a longitudinally extending slit 71 providing outwardly bendable lips L as shown in Fig. 7. In the lower or entrance end of the nipple 68 is a recess 72 in which is seated an air filter 73 formed such as a synthetic cellulosic sponge. 74 in Fig. 3 indicates a special spanner wrench for unscrewing the valve assembly V from the body 12, or for screwing it into place. 81 represents a cusp in its upper end terminating in a beak or claw and having a pin 83. The claw fits over the boss 31 of the valve assembly V and the pin 83 fits into the radial orifice 32 in the boss for screwing up and for unscrewing the valve assembly V from the body 12. Whereas, in Fig. 1 there are shown two complete tubes 17 and 20, this construction may be modified as shown in Fig. 13 by a single overall tube 75 with a diametrical wall or septum 76 dividing the tube longitudinally into two independent D-shaped lumens 17' and 20' that will correspond functionally to 17 and 20 respectively.

Referring once more to the spoon-like element 15 with a wry handle or neck portion 51 which terminates in a bowl-portion 77 that is more or less like a conventional symmetrically-shaped bowl of a spoon with the bowl in non-axial alignment with the neck portion, but substantially aligned with the gauge 14. That is, the bowl is non-symmetrical in shape and located out of axial alignment with the neck portion but in alignment with the gauge. Such a bowl is shown in Figs. 14 to 16 wherein one edge 78 of the bowl is generally convex while the opposite edge 79 is generally concavo-convex for the main purpose of assuring contact of the bowl with the thenar prominence 80 of the operator's hand when the bulb of the sphygmomanometer is gripped. The thenar prominence is that part of the palm from which the thumb extends. This shape of the bowl of the spoon permits freer activity of the operator's fingers in compressing the bulb against the uncovered other portion of his palm while yet getting the full effect of the rigidifying action of the spoon on the sphygmomanometer itself.

The embodiment shown is for a right-handed technician, so for a left-handed person, the parts have to be reversed, namely, looking at the gauge, the valve is at the right (instead of the left), and the spoon is at the left while its curve, if any, is toward the right, but the functioning of the parts remains the same.

In operation: after emplacing the cuff 11 on the patient, the technician takes his sphymomanometer in his hand as shown in Fig. 16 and then folds it into his hand until the spoon 77 is in contact with the thenar prominence 80 of his hand, whereupon he holds the spoon thereagainst while his fingers pump the bulb 13—that is, alternately compress it and let it expand. Compression of the bulb forces air upwardly through the air-filter 73 into the resilient tube 69, whose slit 71 opens, as shown in Fig. 7, to form opened lips L, for the escape of the compressed air into the surrounding bore 65, and then (see Fig. 9) through bore 27 in the boss 24 of the valve assembly V, and up the connecting bore extension 28 into duct 19 in the body 12, leading to the tube 20, and through it to and into the cuff 11. Upon cessation of such compression and while the bulb expands by sucking air thereinto from the atmosphere, the pressure in the passageways 20, 19, 28, 27 and 65 causes the resilient tube 69 to close its slit 71, as shown in Fig. 6, thus acting as a check valve or back-up valve. This alternating action is repeated until the cuff has been inflated to a sufficient usual over-pressure as measured through tube 17 and duct 16 connected with the aneroid pressure-indicating gauge 14. Thereupon the technician while holding the bulb with the spoon against 80, places his thumb and forefinger so as to grasp between them the cap piece 34 of the valve assembly V to rotate it, while still holding the sphygmomanometer and its parts upright with his other fingers. Rotation of the cap piece (see Fig. 9), unseats valve plug 36 from its seat 37 and this permits escape of air-pressure from the cuff 11, through tube 20 and duct 19 through core 27, valve seat 37, and radial orifices 32. The cap piece is rotated to open and to close it until the appropriate pressure is reached in the inflated cuff, as shown on the gauge 14, whereupon the blood pressure of the patient is noted. In this arrangement, it is to be noted that the pressure in the inflated cuff is conducted to the gauge through an independent passageway including the tube 17 and duct 16, whereby it is not affected or distributed by the pressure flow either way from the bulb up duct 19 and tube 20 to the cuff or reverse flow therethrough. In this manner, a much steadier indication of pressure on the gauge results because the pulsations on the inflating and deflating passageways tend to be absorbed by the cushion of air in the cuff and are not substantially passed to the gauge.

Now suppose the valve assembly needs renewing: the technician takes the spanner 74, places the beak or claw 82 over the cylindrical portion marked in Fig. 1 as 23 with an arrow, with the pin 83 entering the radial orifice 32 and unscrews and removes the valve assembly V from its emplacement in the outlet port 21 of the duct 19 in the body 12. A new or repaired assembly is then put in place by a reversal of these steps.

In the event the technician desires to attempt repair or replacement of parts in the valve assembly V, he disassembles it as shown in the exploded view of Fig. 8. However, it is to be noted that the parts cannot be disassembled until first the spring clip 48 is removed by springing its straddling legs 49 and 50 out of the groove 44 so that the flattened portion 47 of the spring clip is withdrawn from within the confines of the cutaway portion or slot 46, for so long as the spring clip 48 is in place, the parts of the valve assembly cannot be disassembled. The spring clip normally controls the possible range of unscrewing of the cap piece 34 and its valve plug 36 when it engages the shoulder 41. The valve plug 36 controls the range of screwing up.

Now coming to the adjustment of the zero position of the dial 57 on the gauge: if that position gets displaced for any reason, and it is desired to restore it, the bezel ring 60 with its crystal 61, is unscrewed and removed from the gauge thus exposing the dial 57. The dial is next removed laterally from the edge 53 of the gauge casing 52, and then rotated to a position whereat the zero position would be correct with respect to the pointer 59 of the gauge, it is replaced on the edge of the casing, being careful to place the lateral extension or ridge 56 in an appropriate one of the depressions formed by the teeth or serrations 55 to align the zero of the dial with the actual zero position of the pointer. Thereafter, the bezel ring 60 and the crystal are replaced, thus holding the dial in its newly adjusted position. This is a very simple way of making such an adjustment.

And coming finally to the modified form of the spoon element 77 shown in Figs. 14 to 16, wherein, like the modification shown in Figs. 1, 2 and 4, the spoon serves as much to act as a stiffener so that the sphygmomanometer does not float around when it is being held by the bulb. But in its improved shape as shown in Figs. 14 to 16, it is smaller and does not rest against the palm of the hand, but rather is limited to contact with the thenar prominence. When the improved spoon rests against the thenar prominence of the hand of the technician, the valve assembly V is in exactly the right position to be manipulated by the forefinger and thumb, while the other fingers hold the bulb with its spoon from which stiffeningly extends the sphygmomanometer itself. In other words, the functional shape and position of the spoon promotes maximum efficiency of the action of both the digits and the thenar prominence of the operating technician.

As this invention may be embodied in several forms without departing from the spirit or essential characteristics thereof, the present embodiment is therefore illustrative and not restrictive, since the scope of the invention is defined by the appended claims rather than by the description that precedes them, and all changes that fall within the metes and bounds of the claims or that form their functional as well as conjointly co-operative equivalents, are therefore intended to be embraced by those claims.

I claim:

1. In a sphygmomanometer, a rigid body member having a duct extending longitudinally from one end thereof, an air-pumping compressible bulb connected to said one end of the body member so as to communicate with said duct, a lateral outlet port through the body member from said duct, a valve assembly for the outlet port carried by the body member, said duct having an outlet in said body by means of which the same may be connected to an inflatable cuff, a second duct extending longitudinally from the opposite end of said body, a pressure-indicating gauge carried by the body member and communicating with the second duct thereof, in which arrangement the valve assembly is rotationally removable from said body member, a check valve extending into the first mentioned duct of the rigid body from its bulb-bearing end and including a closed-end resilient hose having intermediate its ends a slit with outwardly bendable lips.

2. In a sphygmomanometer, a rigid body member having a duct extending longitudinally from one end thereof, an air-pumping compressible bulb connected to said one end of the body member so as to communicate with said duct, a lateral outlet port through the body member from said duct, a valve assembly for the outlet port carried by the body member, said duct having an outlet in said body by means of which the same may be connected to an inflatable cuff, a second duct extending longitudinally from the opposite end of said body, a pressure-indicating gauge carried by the body member and communicating with the second duct thereof, in which arrangement the valve assembly is rotationally removable from said body member, a check valve extending into the first mentioned duct of the rigid body from its bulb-bearing end and including a closed-end resilient hose having intermediate its ends a slit with outwardly bendable lips, an air-filtering disc carried by the bulb-bearing end of the check valve.

3. In a sphygmomanometer, an elongate rigid body presenting a neck at one end, an air-pumping compressible bulb engaged upon said neck, said body having a longitudinally extending passageway extending thereinto from said neck, a flexible tube extending from the opposite end of said body for connection to an inflatable cuff, and a check valve removably engaged within said passageway, said check valve including a flexible, resilient tube closed at the inner end thereof and positioned within said passageway, said tube being of a diameter smaller than the passageway to present an air chamber therearound, and said tube having a longitudinally extending slit intermediate its ends.

4. In a sphygmomanometer, an elongate rigid body having an air-pumping compressible bulb connected to one end thereof, a longitudinally extending passageway extending into said body from the neck end thereof, a check valve removably disposed within said passageway, said body also having a longitudinally extending duct therein having an inner end portion thereof lying in side-by-side relationship to said passageway and extending therefrom to and opening upon the opposite end of the body, a transverse bore in said body intersecting said duct and said passageway, a pressure relief valve received within said transverse bore and being manually operable to be opened and closed.

5. The assembly as defined in claim 4 wherein a handle is provided rigidly connected to said body, said handle being in the form of a spoon extending beyond said neck end of the body and lying closely adjacent to said bulb whereby the spoon may be grasped to manipulate the bulb and to hold the body rigidly therewith.

6. The assembly as defined in claim 5 wherein a second duct is provided in said body, a pressure indicating gauge carried by said body connected to said second duct, and tube means extending from said two ducts for connection to an associated inflatable cuff.

7. The assembly as defined in claim 5 wherein said check valve includes a resilient flexible tube disposed within said passageway and closed at the inner end thereof, said tube having a longitudinally extending slit intermediate the ends thereof.

8. The assembly as defined in claim 6 wherein said check valve includes a resilient flexible tube disposed within said passageway and closed at the inner end thereof, said tube having a longitudinally extending slit intermediate the ends thereof.

9. In a sphygmomanometer, an elongate rigid body having a passageway therein for leading to an inflatable cuff, said passageway opening upon one end of said body, an air-pumping compressible bulb connected to said one end of the body and communicating with said passageway, a check valve removably secured within said passageway, said check valve including a metallic externally threaded nipple having a longitudinally extending bore therethrough, said nipple being removably threadedly engaged within that portion of the passageway opening upon said one end of the body, a flexible resilient tube secured to the said inner end of the nipple and being closed at its opposite end, said tube being of a diameter less than the diameter of the passageway portion within which it is disposed to leave an air chamber therearound, and said tube being provided wtih a longitudinally extending slit intermediate the ends thereof.

References Cited in the file of this patent

UNITED STATES PATENTS

| | | |
|---|---|---|
| 834,185 | Campbell | Oct. 23, 1906 |
| 990,277 | Lauderdale | Apr. 25, 1911 |
| 1,166,719 | Shebol et al. | Jan. 4, 1916 |
| 1,222,315 | Manning | Apr. 10, 1917 |
| 1,225,395 | Beachler | May 8, 1917 |
| 1,500,629 | Levy | July 8, 1924 |
| 1,644,824 | Fedde | Oct. 11, 1927 |
| 1,679,978 | Konwiser et al. | Aug. 7, 1928 |
| 2,630,796 | Eksten | Mar. 10, 1953 |

FOREIGN PATENTS

| | | |
|---|---|---|
| 591,770 | Germany | June 9, 1932 |